(12) United States Patent
Tayman

(10) Patent No.: US 10,793,265 B2
(45) Date of Patent: Oct. 6, 2020

(54) VERTICALLY ORIENTED TUBE-LAUNCHABLE ROTARY WING AIRCRAFT HAVING RESPECTIVE ROTORS AT OPPOSITE ENDS OF MAIN BODY

(71) Applicant: The Government of the United States of America, as represented by the Secretary of the Navy, Arlington, VA (US)

(72) Inventor: Steven K. Tayman, Alexandria, VA (US)

(73) Assignee: The Government of the United States of America, as represented by the Secretary of the Navy, Washington, DC (US)

(*) Notice: Subject to any disclaimer, the term of this patent is extended or adjusted under 35 U.S.C. 154(b) by 349 days.

(21) Appl. No.: 15/941,133

(22) Filed: Mar. 30, 2018

(65) Prior Publication Data

US 2018/0281939 A1 Oct. 4, 2018

Related U.S. Application Data

(60) Provisional application No. 62/479,069, filed on Mar. 30, 2017.

(51) Int. Cl.
*B64C 27/50* (2006.01)
*B64C 27/10* (2006.01)
*B64C 39/02* (2006.01)

(52) U.S. Cl.
CPC ............. *B64C 27/50* (2013.01); *B64C 27/10* (2013.01); *B64C 39/024* (2013.01); *B64C 2201/024* (2013.01); *B64C 2201/042* (2013.01); *B64C 2201/08* (2013.01); *B64C 2201/108* (2013.01); *B64C 2201/126* (2013.01); *B64C 2201/18* (2013.01); *B64C 2201/201* (2013.01)

(58) Field of Classification Search
CPC ....... B64C 27/50; B64C 27/10; B64C 39/024; B64C 11/28; B64C 2201/024; B64C 2201/042; B64C 2201/08; B64C 2201/108; B64C 2201/126; B64C 2201/18; B64C 2201/201
See application file for complete search history.

(56) References Cited

U.S. PATENT DOCUMENTS

| | | |
|---|---|---|
| 8,469,307 B2 | 6/2013 | Arlton et al. |
| 9,434,471 B2 | 9/2016 | Arlton et al. |
| 2008/0245924 A1 | 10/2008 | Arlton et al. |

(Continued)

FOREIGN PATENT DOCUMENTS

KR 10-0786313 B1 12/2007

*Primary Examiner* — Rodney A Bonnette
(74) *Attorney, Agent, or Firm* — US Naval Research Laboratory; Richard Bis

(57) ABSTRACT

An expendable rotary wing unmanned aircraft capable of storage in a cylindrical housing includes a longitudinally extending body having an upper end and a lower end; and a pair of counter-rotating coaxial rotors each located at respective ends of longitudinally-extending body, wherein each rotor includes two or more blades, each blade rotatably coupled to a remainder of the rotor at a hinged joint and thereby extending along a length of the body in a storage configuration and extending radially outward from the body in a flight configuration.

13 Claims, 10 Drawing Sheets

(56) References Cited

U.S. PATENT DOCUMENTS

2009/0212157 A1   8/2009  Arlton et al.
2014/0299708 A1  10/2014  Green et al.
2015/0008280 A1*  1/2015  Smoker .................... F41F 3/10
                                                244/63
2016/0167778 A1   6/2016  Meringer et al.

* cited by examiner

VERTICALLY ORIENTED TUBE-LAUNCHABLE ROTARY WING AIRCRAFT HAVING RESPECTIVE ROTORS AT OPPOSITE ENDS OF MAIN BODY

RELATED APPLICATIONS

This application claims the benefit of U.S. Provisional Application No. 62/479,069 filed Mar. 30, 2017, which is hereby incorporated herein by reference.

FIELD OF INVENTION

The present invention relates generally to unmanned vehicles, and more particularly to an unmanned rotary wing vehicle capable of launch from a tube.

BACKGROUND

There have been many fixed wing unmanned aircraft designs that are tube launched but relatively few rotary wing aircraft. Tube launched fixed wing aircraft that achieve a high payload capacity relative to the tube volume have a very high stall speed and cannot hover over a point of interest or maintain position with respect to a slow moving object such as a ship or truck. Conventional rotary wing craft deployed from tubes do not use space efficiently.

SUMMARY OF INVENTION

Therefore, presented is an expendable rotary wing unmanned aircraft design that may be stored in a cylindrical canister/launcher and launched into flight on command in seconds. Exemplary embodiments provide the ability to store a rotary wing aircraft in a space efficient manner for long time periods yet be launched into flight within seconds whenever needed. Exemplary vehicle designs are volume efficient, simple, cost effective, and maximize the payload volume and weight possible for a given size tube. Exemplary embodiments are capable of launch from land, sea, and air platforms. Possible missions for such a vehicle include electronic warfare, military reconnaissance, precision ordinance delivery, law enforcement surveillance, intelligence gathering, precise sensor delivery, hazardous area inspections, environmental monitoring, etc.

Exemplary embodiments have rotors located at the opposite ends of the body to maximize the rotor diameter possible for a given length and the clearance between the counter-rotating rotors which is particularly important during launch, enables modular construction with nearly identical propulsion modules on each end, and can be ground launched from the storage canister in addition to air launched. Also, exemplary embodiments include a square cross-section with rounded corners, increasing the useful internal volume of the vehicle available for a given size tube.

According to one aspect of the invention, an expendable rotary wing unmanned aircraft capable of storage in a cylindrical housing includes a longitudinally extending body having an upper end and a lower end; and a pair of counter-rotating coaxial rotors each located at respective ends of longitudinally-extending body, wherein each rotor includes two or more blades, each blade rotatably coupled to a remainder of the rotor at a hinged joint and thereby extending along a length of the body in a storage configuration and extending radially outward from the body in a flight configuration.

Optionally, the aircraft includes torsion springs located at the hinged joint and configured to force the blades radially outward when transitioning from a storage configuration to a flight configuration.

Optionally, the longitudinally extending body includes a constant cross-section shell.

Optionally, the aircraft includes a selectively-deployable landing gear located longitudinally outward of the rotor located at the lower end of the body.

Optionally, the aircraft includes a payload located longitudinally between the rotor located at the lower end of the body and the landing gear.

Optionally, the aircraft includes a payload located longitudinally outward of the rotor located at the upper end of the body.

Optionally, the aircraft includes a payload located longitudinally outward of the rotor located at the lower end of the body.

Optionally, the aircraft includes a first payload located longitudinally outward of the rotor located at the upper end of the body and a second payload located longitudinally outward of the rotor located at the lower end of the body.

Optionally, the aircraft includes a selectively deployable landing gear located longitudinally outward of the second payload.

Optionally, the aircraft includes a foldable mast extending along the body in a storage configuration and radially away from the body in a flight configuration.

Optionally, the aircraft includes a compressed-gas launch system.

Optionally, each pair of blades fold along the body in a storage configuration and extend from their respective hinged joints toward the hinged joints of the other pair of blades, thereby causing each pair of blades to overlap the other pair of blades in the longitudinal direction.

The foregoing and other features of the invention are hereinafter described in greater detail with reference to the accompanying drawings.

DETAILED DESCRIPTION

Figure 1:
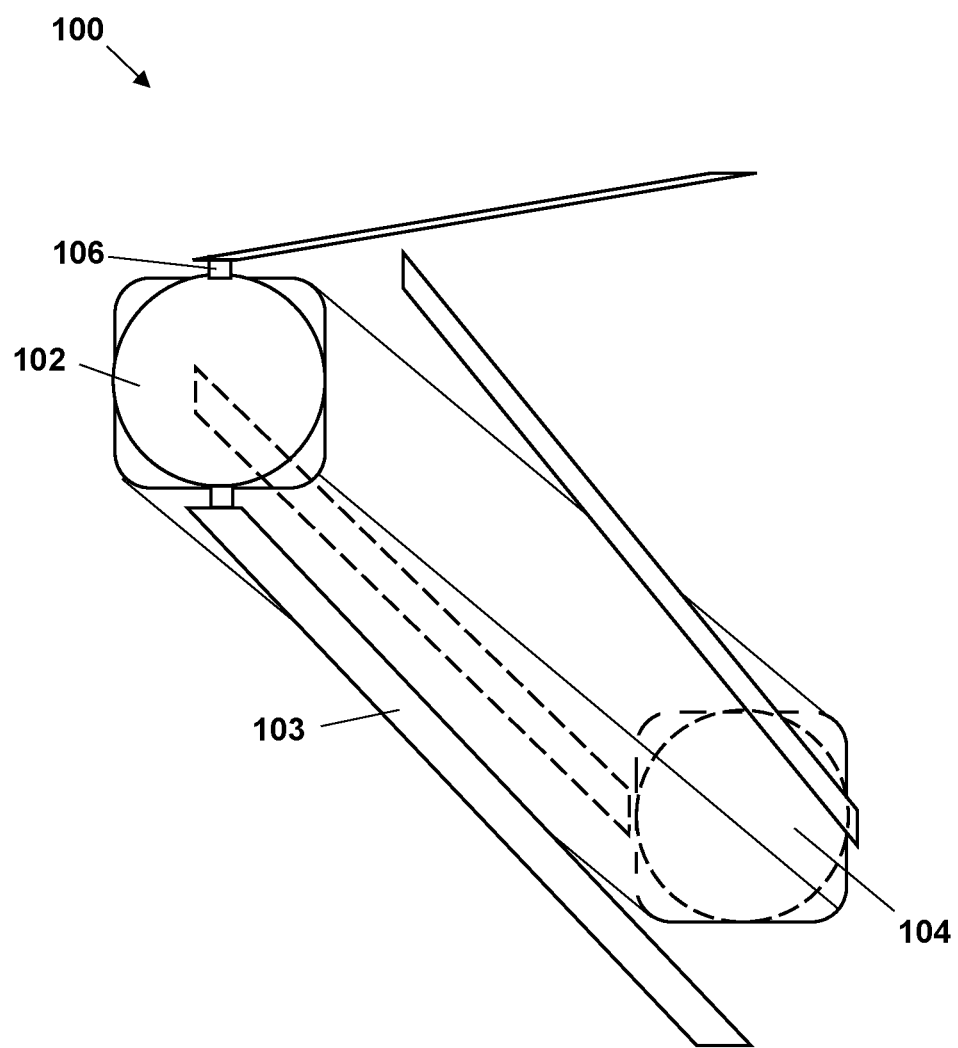
FIG. 1 shows a schematic representation of an exemplary vehicle in isometric view.
Figure 2:
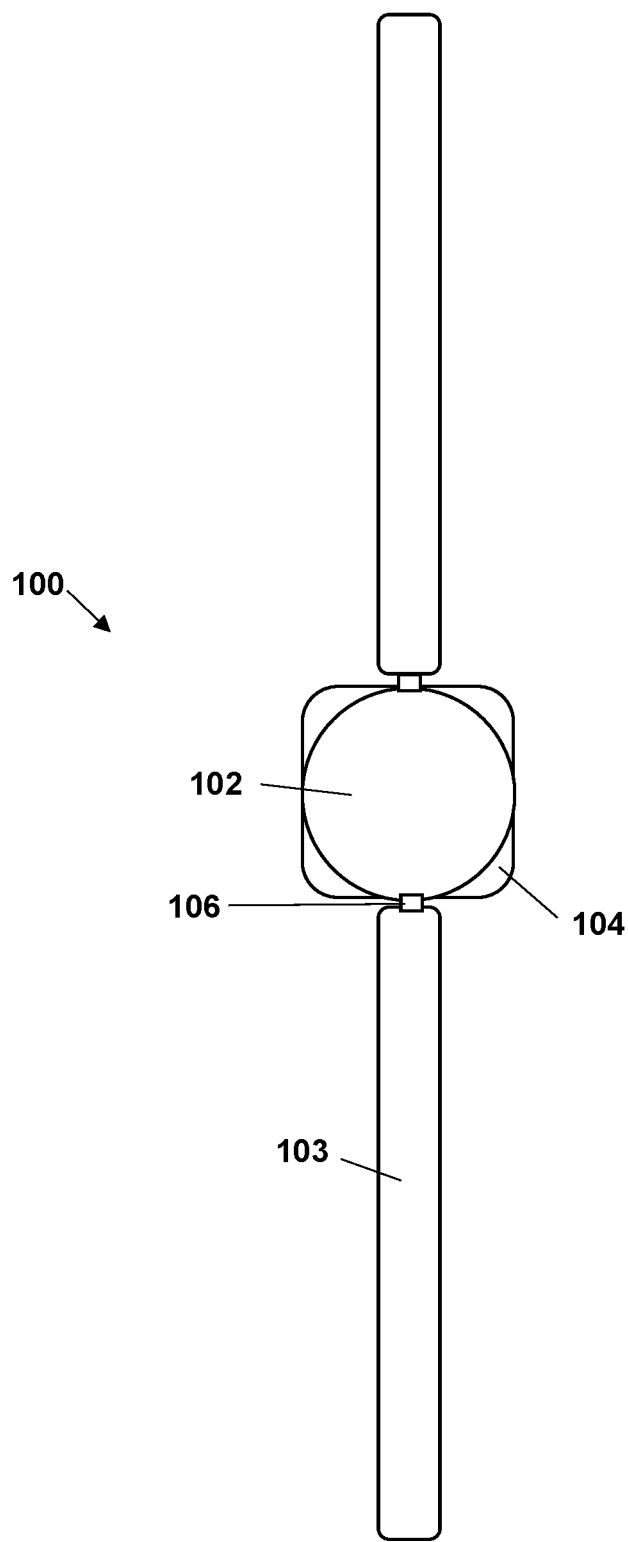
FIG. 2 shows a schematic representation of an exemplary vehicle in top view.
Figure 3:
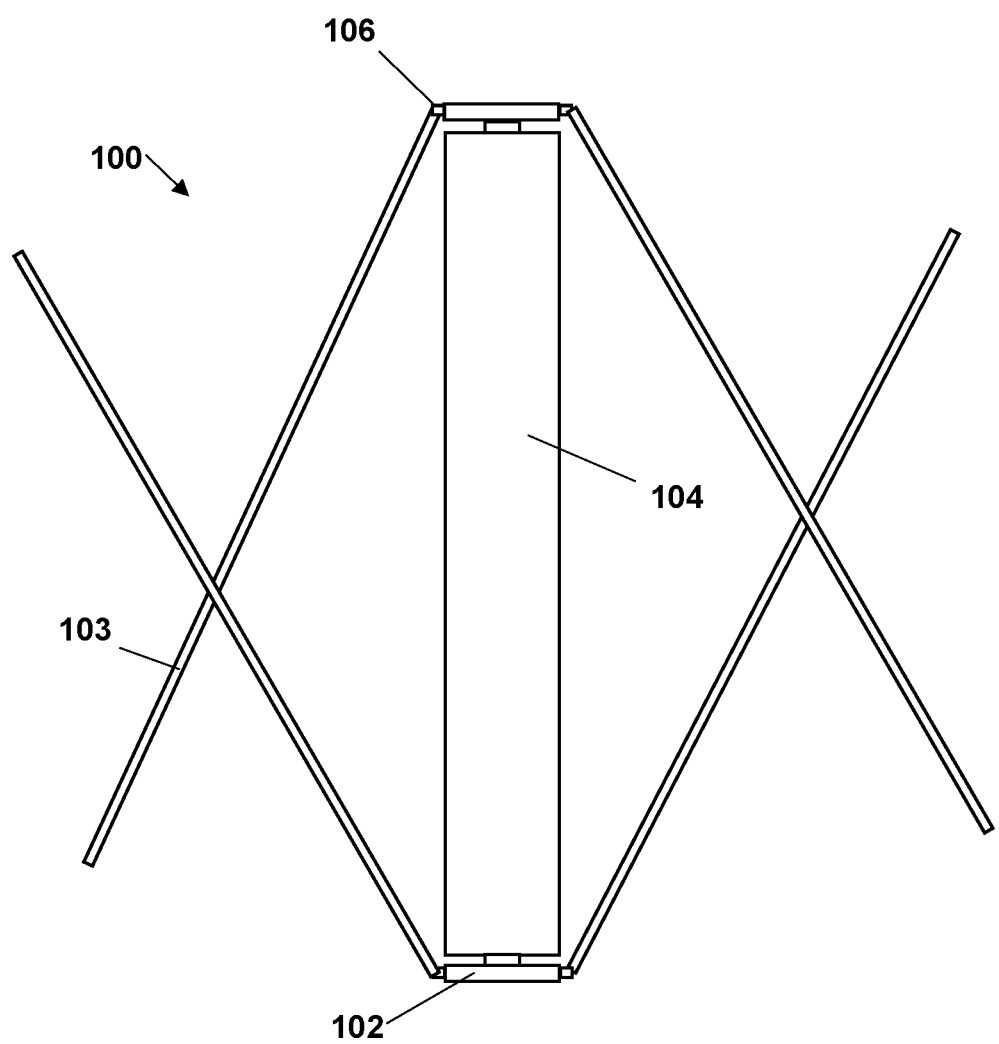
FIG. 3 shows a schematic representation of an exemplary vehicle in side view.
Figure 4:
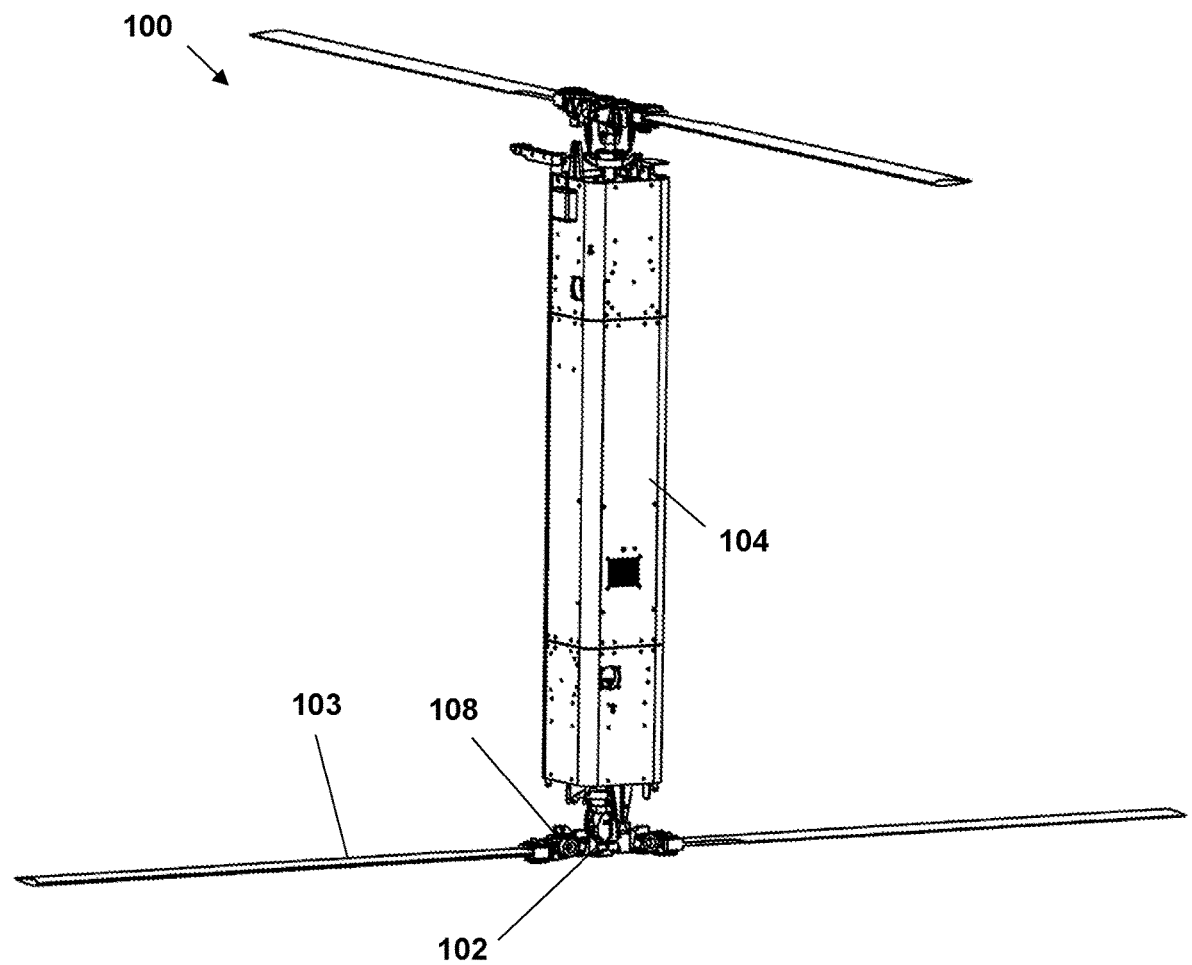
FIG. 4 shows an exemplary vehicle in perspective view.

Shown schematically in isometric view in FIG. 1, top view in FIG. 2, and side view in FIG. 3, an exemplary rotary wing aircraft 100 include counter-rotating coaxial rotors 102—each having, preferably, two blades 103—located at opposite ends of a, preferably square (more preferably square with rounded corners), fuselage/body 104 that fold at hinged joints 106 along the length of the body to efficiently fit in a round tube. Torsion springs 108, shown in FIG. 4, located at the folding pivot help pull the blades when launched out of the tube. The blades can be held in place by the tube or with a servo mechanism (not shown) if desired to be able to keep the blades stowed after exiting the tube. The rotor system at each end of the aircraft is nearly identical with its own electric motor, transmission, swashplate, control servos, rotor hub and blades. The design minimizes the number of unique components which helps reduce cost. The center module is designed to contain the propulsion battery and payload. The payload weight is preferably near the center of gravity and the center section can be different lengths with minimal impact on flying characteristics. A constant cross-section shell makes the airframe very strong, simple and weight efficient.

Figure 10:
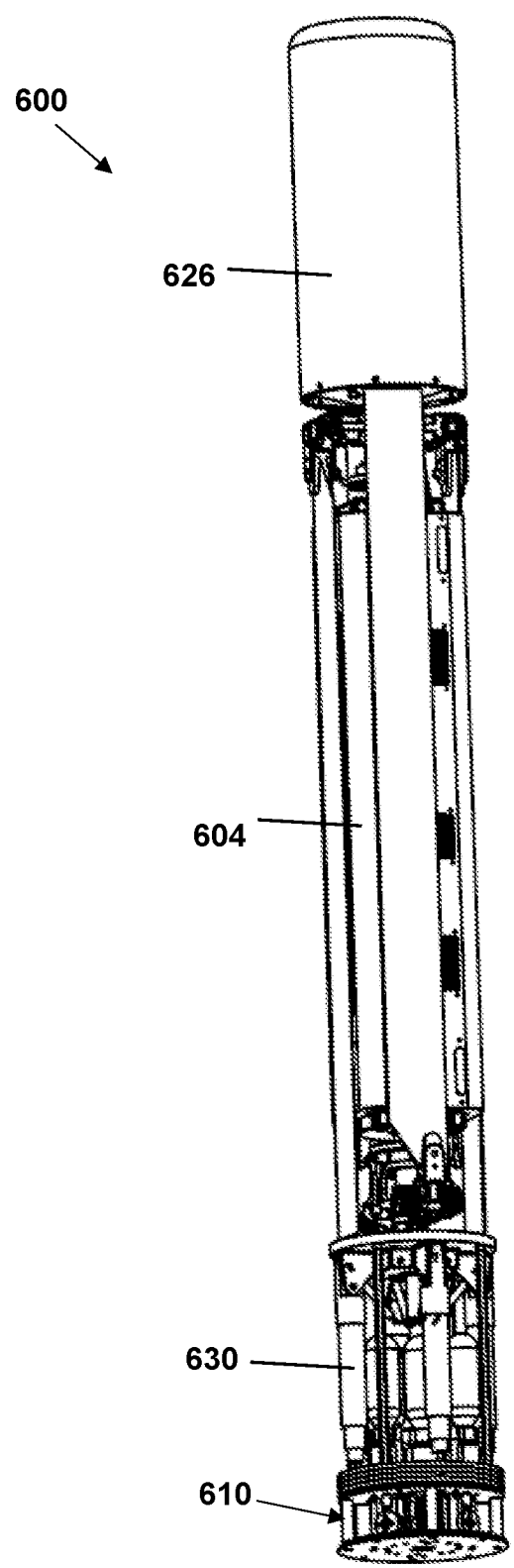
FIG. 10 shows an exemplary vehicle folded for storage and having an optional gas-launch system.

The vehicle can be launched in several ways. One launch method is to use compressed gas to push the vehicle out of the tube to sufficient altitude such that the rotors can spin up to speed and the vehicle can start flying in mid-air. An exemplary vehicle having such a gas-powered launch system 610 is shown in FIG. 10 at 600. The use of a sensored electric motor propulsion system enables the rotor to spin up to flight speed in one second. The launch tube may use sealed commercial $CO_2$ cartridges to generate the high pressure gas and requires no external compressed air source, although alternative embodiments may use external systems, if desirable. A conventional compressed air launch system could also be used for launch but would be more complex and take up more space. The $CO_2$ system is safe, simple, economical and compact.

Alternatively, a gas generator system would be compact and reliable but more expensive to develop. A solid rocket motor could also be used for launch especially if higher initial altitudes are desired. The vehicle design is also suitable for deployment from an air drop. From high speed aircraft, a parachute would be used to slow the canister down before the vehicle is released into flight.

Exemplary embodiments give the ability to store and launch a highly maneuverable rotary wing aircraft from a compact tube. Relative to other tube launched equivalent fixed wing options, the aircraft has more payload volume, ability to hover and station keep relative to slow moving targets, and the ability to point independent of vehicle velocity.

Compared to other tube launched rotary wing aircraft, exemplary embodiments have a larger more efficient rotor diameter, increased modularity, and can be deployed in higher relative winds and airspeeds due to the much larger rotor blade separation. The center section module can be made longer to increase the volume available for payload or battery with a slight reduction in maximum airspeed. Also, the center section could have a different cross-section shape or fold out features if desired for a unique payload or mission.

Figure 5:
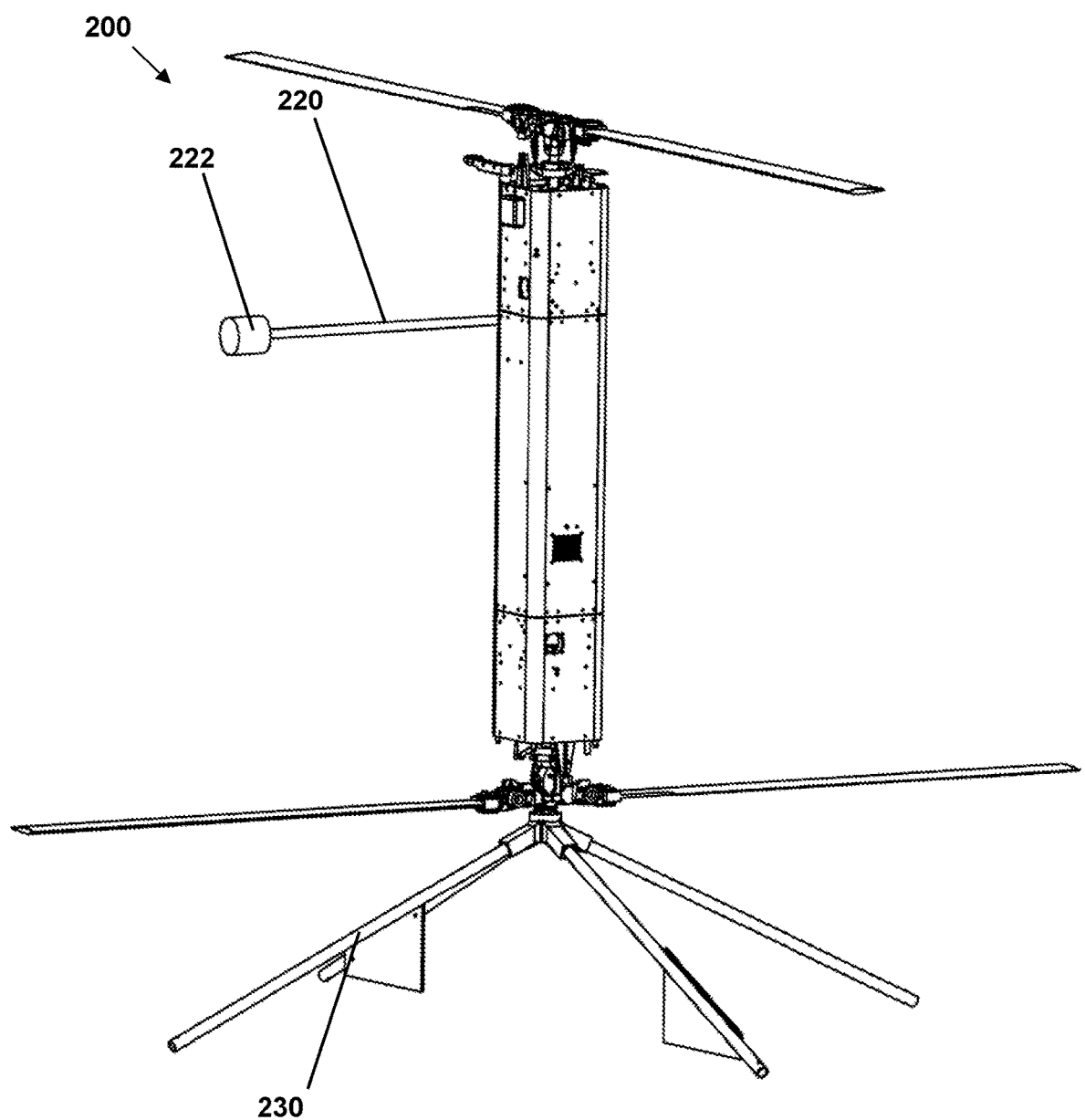
FIG. 5 shows an exemplary vehicle including an optional lateral mast and optional landing gear.

Also, a landing gear 230, shown in FIG. 5, could be folded up inside the tube if a conventional landing is desired. Prototype exemplary vehicles have been recovered in a net after a tube launch and have used a landing gear on bearings for conventional takeoffs and landings.

The rotor system could have a stationary or foldable laterally-extending mast 220, as shown in FIG. 5, with a modest increase in cost and weight, which would enable components 222 to be easily located between the rotors.

Components could also be located above and/or below a mast. In some embodiments, the mast may be a spinning mast in which case the orientation of the payload may be controlled by small drive motors to counteract the spinning of the mast and hold the payload in a fixed orientation relative to the body of the vehicle. For example, a camera could be located below the rotor with its own battery, drive motor, and controlled wirelessly. In exemplary vehicles having a non-rotating mast, such payloads may, of course, also have their orientation controlled by small drive motors, but such a system would not need to constantly adjust for the spinning of the mast and could receive power and signals from a wired connection. Examples of exemplary vehicles having longitudinally-extending payloads are shown in FIGS. 6-10.

Figure 6:
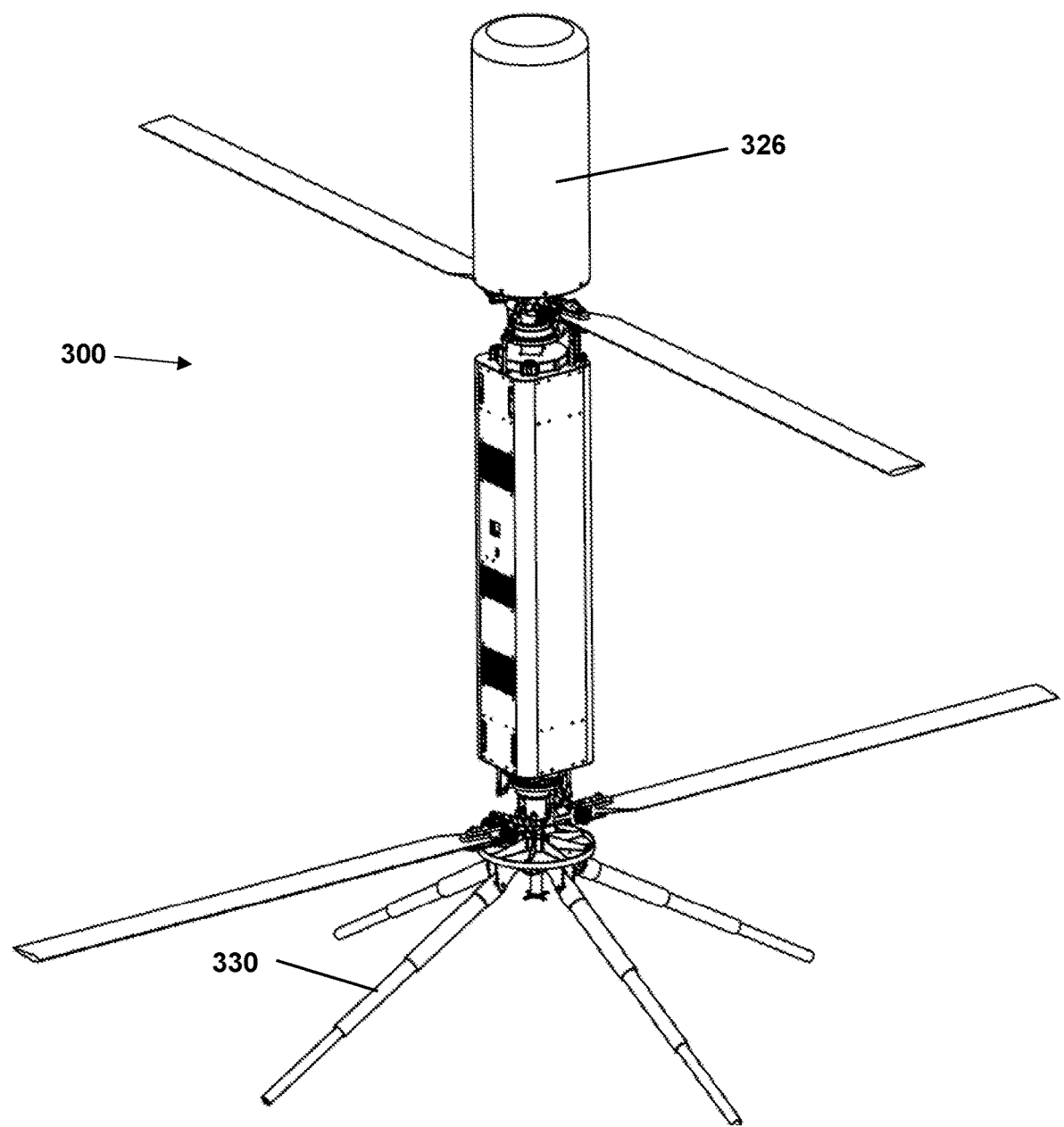
FIG. 6 shows an exemplary vehicle with an optional longitudinal payload on the top end and a selectively-deployable landing gear on the bottom end.
Figure 7:
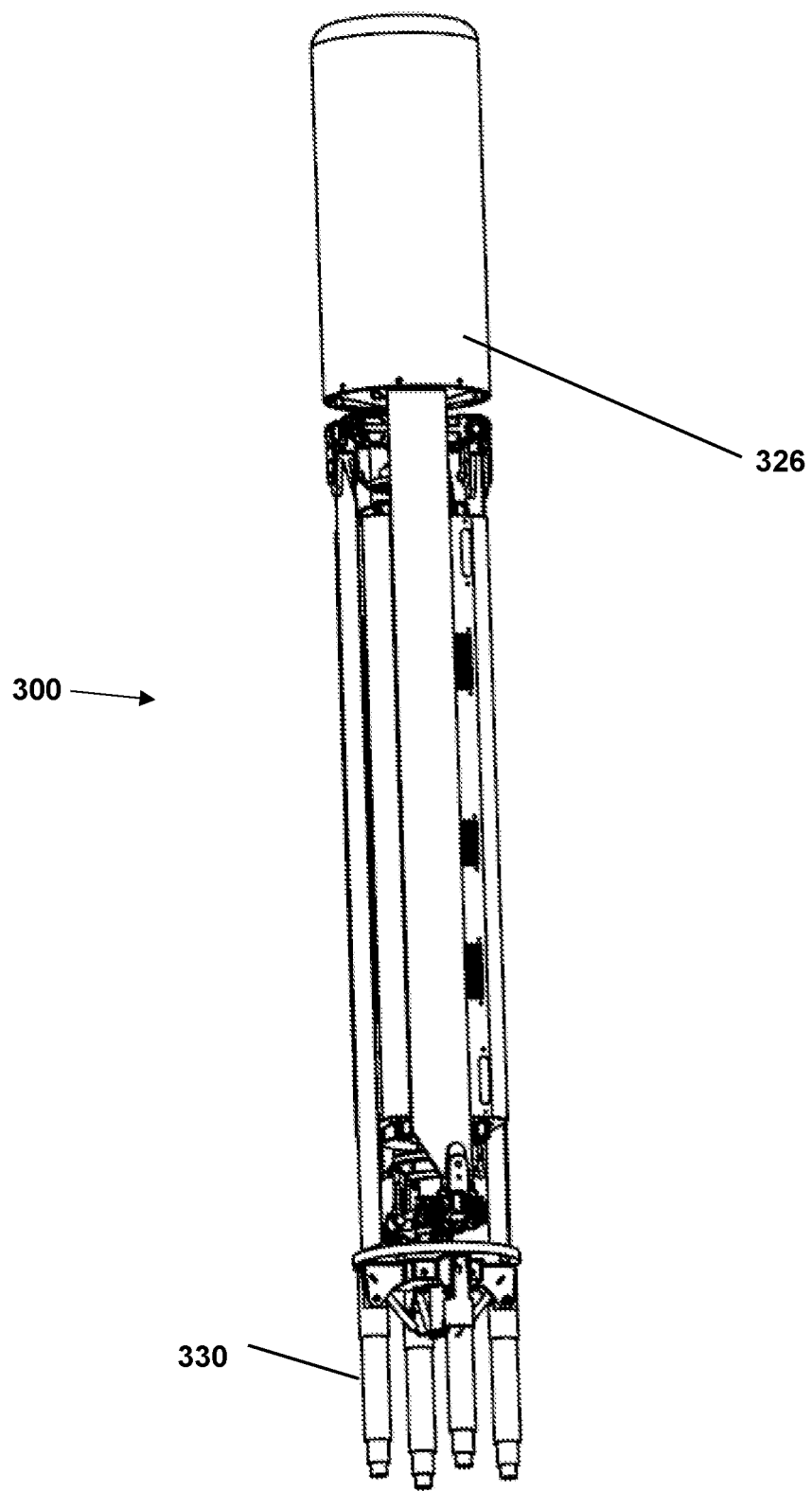
FIG. 7 shows the exemplary vehicle of FIG. 6 folded up for storage.
Figure 8:
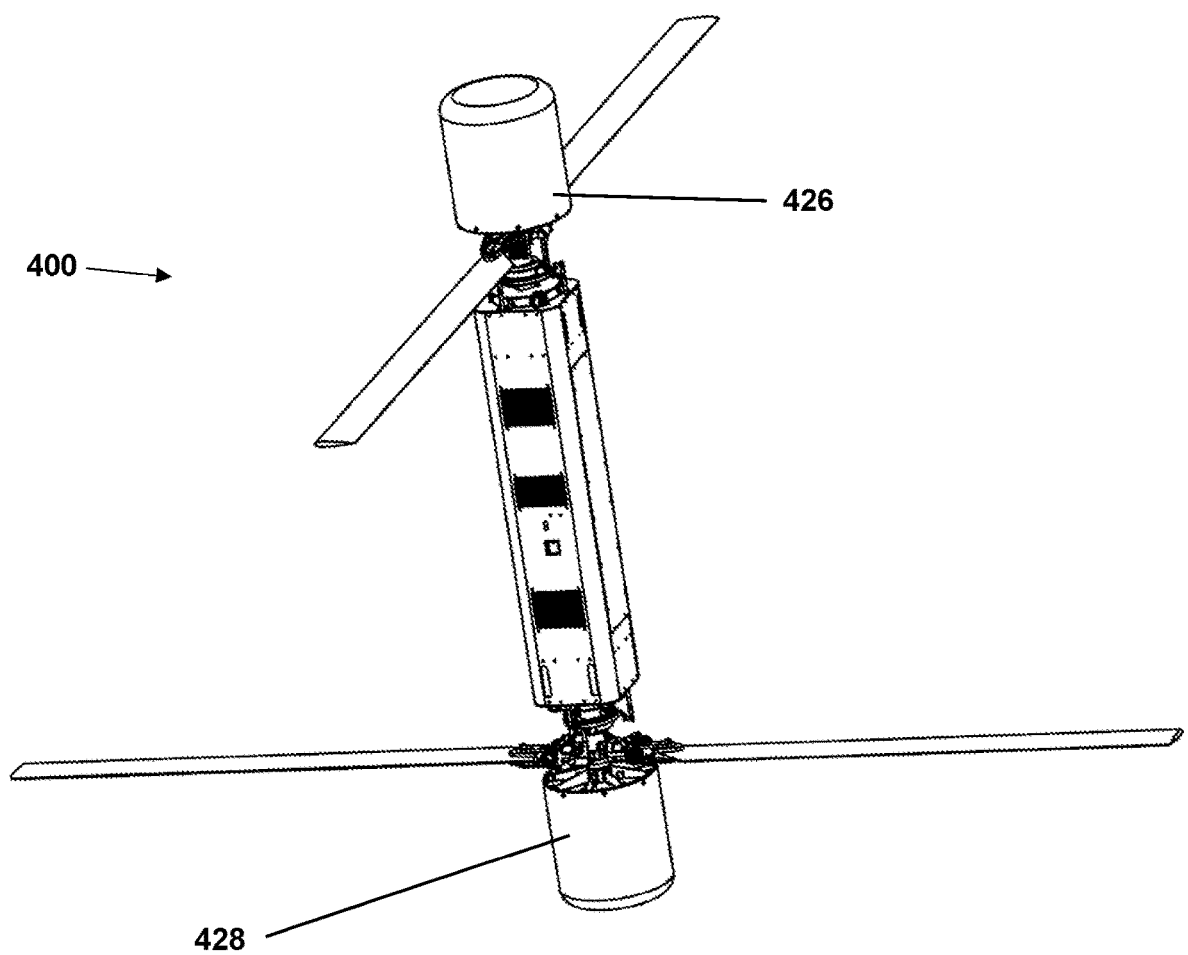
FIG. 8 shows an exemplary vehicle having optional longitudinal payloads on both ends.

FIG. 6 shows an exemplary vehicle 300 having a payload 326 positioned longitudinally outward (above) the top rotor and a selectively-deployable landing gear 330 longitudinally outward (below) the bottom rotor. This vehicle 300 is shown again in FIG. 7 folded in a storage position prior to deployment. FIG. 8 shows another exemplary embodiment 400 having a payload 426 longitudinally outward (above) the upper rotors and a payload 428 longitudinally outward (below) the bottom rotors.

Figure 9:
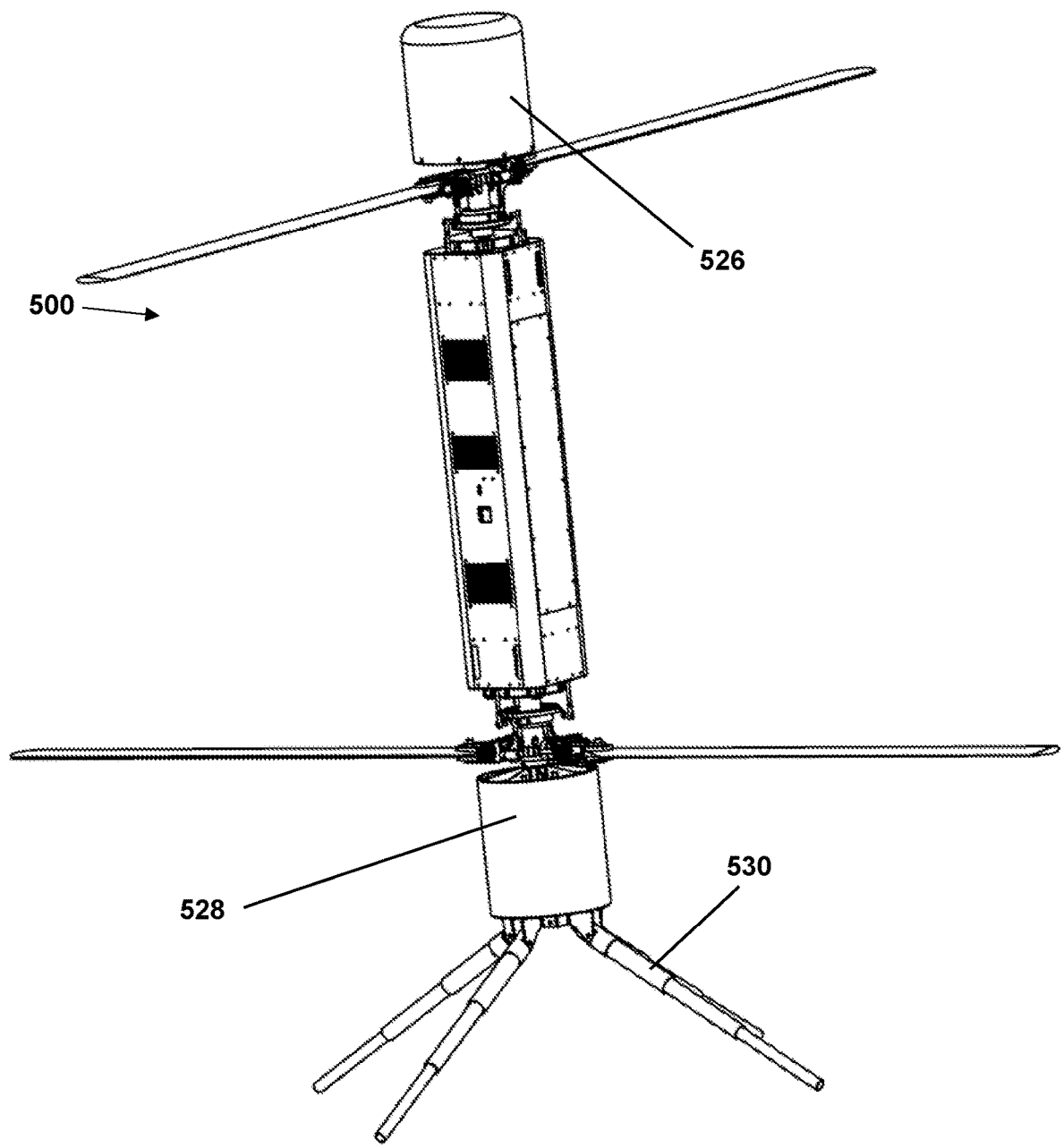
FIG. 9 shows an exemplary vehicle having optional longitudinal payloads on both ends and a selectively-deployable landing gear at the bottom end.

FIG. 9 shows another exemplary embodiment similar to that shown in FIG. 8, but with the addition of a selectively-deployable landing gear 530 located longitudinally outward (below) the lower payload 528.

FIG. 10, as mentioned, includes an optional gas-powered launch system 610 along with an upper payload 626 and a selectively-deployable landing gear 630 located longitudinally outward (below) the main body 604 and opposite the upper payload 626.

The invention could also use rocket propulsion to get to high altitudes quickly. The rotors would provide control and a solid rocket booster would augment the rotor thrust. The rocket booster could be jettisoned after it is expended, thereby lightening the operational payload, once deployed.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An expendable rotary wing unmanned aircraft capable of storage in a cylindrical housing, the aircraft comprising:
 a longitudinally extending body having an upper end and a lower end; and a pair of counter-rotating coaxial rotors each located at respective ends of longitudinally-extending body, wherein each rotor includes two or more blades, each blade rotatably coupled to a remainder of the rotor at a hinged joint and thereby extending along a length of the body in a storage configuration and extending radially outward from the body in a flight configuration, wherein each pair of blades fold along the body in a storage configuration and extend from their respective hinged joints toward the hinged joints of the other pair of blades, thereby causing each pair of blades to overlap the other pair of blades in the longitudinal direction.

2. The aircraft of claim 1, further comprising torsion springs located at the hinged joint and configured to force the blades radially outward when transitioning from a storage configuration to a flight configuration.

3. The aircraft of claim 1, wherein the longitudinally extending body includes a constant cross-section shell.

4. The aircraft of claim 1, further comprising a selectively-deployable landing gear located longitudinally outward of the rotor located at the lower end of the body.

5. The aircraft of claim 4, further comprising a payload located longitudinally between the rotor located at the lower end of the body and the landing gear.

6. The aircraft of claim 1, further comprising a payload located longitudinally outward of the rotor located at the upper end of the body.

7. The aircraft of claim 1, further comprising a payload located longitudinally outward of the rotor located at the lower end of the body.

8. The aircraft of claim 1, further comprising a first payload located longitudinally outward of the rotor located at the upper end of the body and a second payload located longitudinally outward of the rotor located at the lower end of the body.

9. The aircraft of claim 8, further comprising a selectively deployable landing gear located longitudinally outward of the second payload.

10. The aircraft of claim 1, further including a foldable mast extending along the body in a storage configuration and radially away from the body in a flight configuration.

11. The aircraft of claim 1, further comprising a compressed-gas launch system.

12. The aircraft of claim 1, wherein the blades do not extend beyond a longitudinal extent of a remainder of the aircraft when in the storage configuration.

13. The aircraft of claim 12, wherein the blades do not extend beyond a longitudinal extent of the body when in the storage configuration.

* * * * *